(12) United States Patent
Laks et al.

(10) Patent No.: US 7,529,055 B1
(45) Date of Patent: May 5, 2009

(54) WRITING REFERENCE PATTERNS IN A DISK DRIVE USING BACK EMF BASED TIMING SIGNALS COMPENSATED FOR REPEATABLE VARIATION THEREIN

(75) Inventors: Jason Laks, Ft. Collins, CO (US); David Scott McMurtrey, Loveland, CO (US); Brian Rigney, Louisville, CO (US); Richard Dennis Lesage, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 644 days.

(21) Appl. No.: 11/392,350

(22) Filed: Mar. 29, 2006

Related U.S. Application Data

(60) Provisional application No. 60/722,392, filed on Sep. 30, 2005.

(51) Int. Cl.
*G11B 21/02* (2006.01)
(52) U.S. Cl. .................................... 360/75; 369/47.48
(58) Field of Classification Search .................. 360/75, 360/51; 369/47.28, 47.48; 381/254, 439
See application file for complete search history.

(56) References Cited

U.S. PATENT DOCUMENTS

| | | | | |
|---|---|---|---|---|
| 5,276,569 A | * | 1/1994 | Even ........................... | 360/75 |
| 5,668,679 A | * | 9/1997 | Swearingen et al. .......... | 360/75 |
| 6,061,200 A | * | 5/2000 | Shepherd et al. ......... | 360/77.04 |
| 6,631,046 B2 | * | 10/2003 | Szita et al. .................... | 360/75 |
| 6,825,622 B1 | * | 11/2004 | Ryan et al. ............... | 318/400.2 |
| 7,088,546 B2 | * | 8/2006 | Ehrlich .................... | 360/77.02 |
| 7,256,956 B2 | * | 8/2007 | Ehrlich ........................ | 360/75 |

* cited by examiner

*Primary Examiner*—Thang V Tran
(74) *Attorney, Agent, or Firm*—Myers Bigel Sibley & Sajovec, P.A.

(57) ABSTRACT

An apparatus is provided for writing reference patterns on a data storage disk of a disk drive. The disk is rotated by a spindle motor. A back EMF sense circuit generates a sequence of zero crossing signals from back EMF sensed on windings of the spindle motor over each revolution of the spindle motor. The sequence of zero crossing signals define a corresponding sequence of zero crossing periods of time between successive zero crossing signals. A Phase Locked Loop (PLL) circuit generates a timing signal in response to comparison of a feedback signal to the zero crossing signals. The PLL circuit also compensates for repeatable variation among the sequence of zero crossing periods over each revolution of the spindle motor so that the timing signal is substantially independent of the repeatable variation among the sequence of zero crossing periods. A recording pattern generator writes reference patterns on the disk in response to the timing signal as the disk is rotated by the spindle motor. Related methods of making a disk drive are also provided.

20 Claims, 9 Drawing Sheets

WRITING REFERENCE PATTERNS IN A DISK DRIVE USING BACK EMF BASED TIMING SIGNALS COMPENSATED FOR REPEATABLE VARIATION THEREIN

RELATED APPLICATION

This application claims the benefit of and priority to U.S. Provisional Patent Application No. 60/722,392, filed Sep. 30, 2005, the disclosure of which is hereby incorporated herein by reference as if set forth in its entirety.

FIELD OF THE INVENTION

The present invention generally relates to disk drives and disk drive manufacturing, and more particularly, to an apparatus for writing reference patterns on a data storage disk of a disk drive and related methods of making a disk drive.

BACKGROUND OF THE INVENTION

Disk drives are commonly used in microprocessor based electronic devices, such as workstations, personal computers, laptops and other computer systems, to store and retrieve large amounts of data. A typical disk drive includes a plurality of magnetic disks that are rotated by a spindle motor and an actuator arm assembly that includes read/write heads mounted to flexure arms. An actuator motor (e.g., voice coil motor) can rotate the flexure arms and heads about a pivot bearing relative to the disks. The heads are configured to fly upon air bearings in very close proximity to the rotating disks.

The surface of each disk is divided into a series of data tracks which are spaced radially from one another across a band having an inner diameter and an outer diameter. The data tracks extend circumferentially around the disks and store data in the form of magnetic flux transitions on the disk surfaces. Each data track is divided into a number of data sectors that store fixed sized blocks of user data. Embedded among the data sectors on each track are servo fields that define servo information that enables the disk drive to control the radial position of the heads relative to tracks on the disks and to determine the circumferential location of the heads.

The servo fields are written to the disks during the manufacture of a disk drive using a highly precise servo track writer, which utilizes the heads of the disk drive to write the servo fields. Because the servo fields are used to define the radial locations of tracks and the location of data along a track, it is important to precisely control the locations on the disk surfaces at which the servo fields are written. Thus, a typical servo track writer includes a precise clock signal generator and an additional recording element that is used to write a reference clock pattern on a disk surface responsive to the clock signal. The reference clock pattern is then read back from the disk surface by the additional recording element to generate a disk reference clock signal synchronized to the rotation of the disks, which is used to determine where to write the servo fields through the read/write heads onto the disks.

Using the additional recording element and manufacturing processes for writing the reference clock pattern on the disk before writing the servo fields can increase the time, cost and possibility of damage during the manufacture of a disk drive. Accordingly, there is a need for an improved approach for generating a reference clock signal that is synchronized to disk rotation and for writing servo fields responsive thereto.

SUMMARY OF THE INVENTION

Some embodiments of the present invention provide an apparatus for writing reference patterns on a data storage disk of a disk drive. The disk is rotated by a spindle motor. A back EMF sense circuit generates a sequence of zero crossing signals from back EMF sensed on windings of the spindle motor over each revolution of the spindle motor. The sequence of zero crossing signals defines a corresponding sequence of zero crossing periods of time between successive zero crossing signals. A Phase Locked Loop (PLL) circuit generates a timing signal in response to comparison of a feedback signal to the zero crossing signals. The PLL circuit also compensates for repeatable variation among the sequence of zero crossing periods over each revolution of the spindle motor so that the timing signal is substantially independent of the repeatable variation among the sequence of zero crossing periods. A recording pattern generator writes reference patterns on the disk in response to the timing signal as the disk is rotated by the spindle motor.

Because the effect of repeatable variation of the zero crossing periods is essentially removed from the timing signal while leaving the effect of non-repeatable variation (related to variation in spindle motor speed), the reference patterns can be written with uniform circumferential spacing around the disk so as to track variation in the rotational speed of the spindle motor.

Related methods of making a disk drive are also provided in accordance with other embodiments of the present invention.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the present invention are directed to an apparatus for writing reference patterns on a data storage disk that is rotated by a spindle motor in a disk drive. A sequence of zero crossing signals are generated from back electromagnetic force (EMF) which is sensed on windings of the spindle motor over each revolution of the spindle motor. The sequence of zero crossing signals defines a corresponding sequence of zero crossing periods of time between successive zero crossing signals. The zero crossing periods in the sequence vary during a revolution of the spindle motor. This variation includes a repeatable component and a non-repeatable component. As used herein, the repeatable component of variation refers to that variation which repeats with each revolution of the disk (i.e., repeats as a function of a rotational phase angle of the disk). The apparatus is configured to generate a timing signal which has been compensated so as to remove the effect of the repeatable zero crossing period variation while leaving the non-repeatable variation. The apparatus writes the reference patterns to the disk in response to the timing signal. Because the effect of repeatable variation is essentially removed from the timing signal while leaving the effect of non-repeatable variation, the reference patterns can be written with uniform circumferential spacing around the disk as the rotational speed of the spindle motor varies. Accordingly, the reference patterns, which may include servo fields, may be uniformly written on the disk without necessitating the use of an additional recording element and an earlier written reference clock pattern on the disk.

Figure 1:
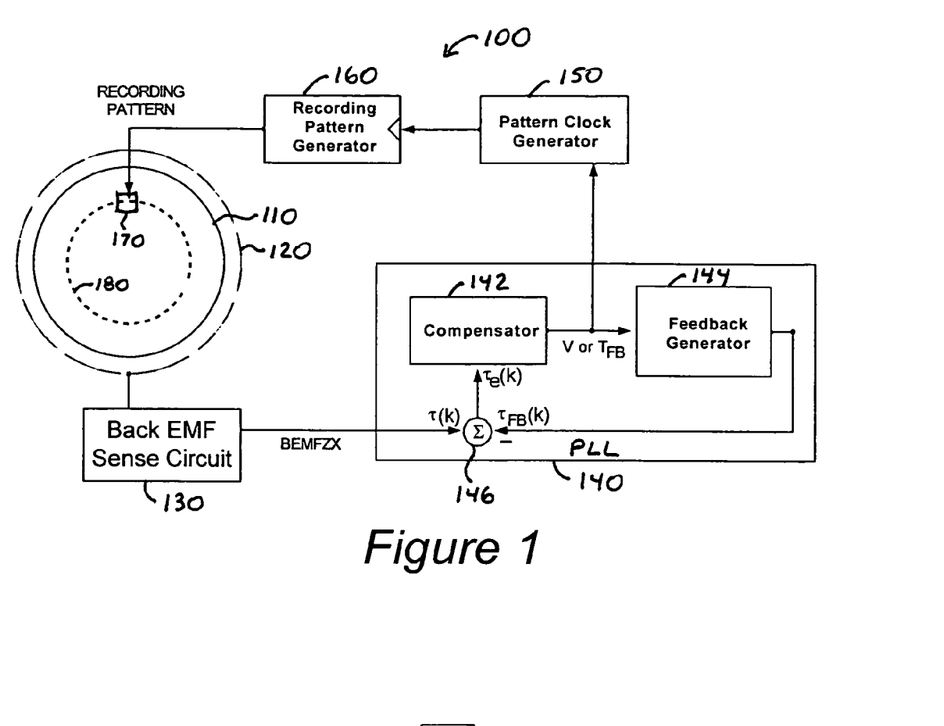
FIG. 1 is a block diagram of an apparatus for writing reference patterns on a data storage disk of a disk drive according to some embodiments of the present invention.

FIG. 1 is a block diagram of an apparatus 100 for writing reference patterns on a data storage disk in accordance with some embodiments of the present invention. The apparatus 100 may be part of a larger device that is specifically configured to write servo tracks on a disk of a disk drive (i.e., a servo track writer) or it may be enclosed within a housing of the disk drive to carry-out self-writing by the disk drive itself of the servo tracks. The apparatus 100 includes a data storage disk 110, a spindle motor 120, a back EMF sense circuit 130, a Phase Locked Loop (PLL) 140, a pattern clock generator 150, and a recording pattern generator 160. Although embodiments of the present invention have been described below in the context of writing references patterns on a magnetic data storage disk, it is to be understand that the invention is not limited thereto and may also be used with other types of disks, such as, for example, optical and/or magneto-optical disks.

The spindle motor 120 can be a brushless direct current (DC) motor configured to rotate the disk 110 at a defined operating rotational speed. The spindle motor 120 has a stationary stator containing a plurality of phases, each phase having one or more sets of electrical windings that are wrapped around poles within the stator with the sets of windings in each phase being electrically connected in series. Each phase can be connected in parallel with the other phases so that all phases share a common center tap in a "Y" or a "star" configuration. The spindle motor 120 also has a rotatable rotor that contains a plurality of permanent magnet segments.

The disk 110 is mechanically mounted to the rotor and rotated by the energizing of the windings within a phase in the stator to induce magnetic fields that interact with the permanent magnet segments in the rotor to cause the rotor, and the disk 110, to rotate in the desired direction at the desired operating speed. The selective energizing of phases in the stator in a predetermined sequence is known as commutation of the motor 120, which involves providing a series of timed commutation steps wherein energy is imparted to the motor 120 to cause it to rotate. The time between each commutation step is called a commutation period, and the number of commutation periods within one mechanical revolution of the motor 120 is a function of the number of phases and the total number of north and south poles in the motor magnet segments. For example, a three phase, twelve pole spindle motor 120 would have 36 commutation steps and 36 corresponding commutation periods in each mechanical revolution of the motor 120, with each commutation step occurring at a unique mechanical alignment of a winding and a pole, where a switch is made from one configuration or commutation step to the next.

A commutation step involves supplying the spindle motor 120 with current to one phase, sinking current from another phase, and holding a third phase at a high impedance so that it remains unenergized. A commutation cycle is defined as a complete sequence of commutation steps such that every phase has in turn sourced current, sunk current, and remained unenergized. The sequencing and timing of commutation steps are supplied to the spindle motor 120 by commutation circuitry in an attempt to cause it to rotate at the desired operating speed.

The back EMF sense circuit 130 measures the back EMF generated on the unenergized phase held at high impedance, compares this voltage to the voltage on the center tap and generates a signal at a zero crossing of the voltages, that is, when the back EMF voltage changes polarity with respect to the voltage on the center tap. Accordingly, the back EMF sense circuit 130 generates a sequence of zero crossing signals BEMFZX from the sensed back EMF over each revolution of the spindle motor 120. The sequence of zero crossing signals BEMFZX defines a corresponding sequence of zero crossing periods of time between successive zero crossing signals. The point at which the zero crossing occurred can be used as a reference for the generation of the timing of the next commutation pulse.

In accordance with embodiments of the present invention, the PLL 140 is configured to generate a timing signal in response to the zero crossing signals BEMFZX. The PLL 140 can include a compensator 142, a feedback generator 144, and a comparator node 146. The compensator 142 generates the timing control signal in response to the timing error signal $\tau_e(k)$. The feedback generator 144 generates a feedback signal $\tau_{FB}(k)$ in response to the timing control signal such that it is adjusted by variations in the timing error signal $\tau_e(k)$. The comparator node 146 subtracts the feedback signal timing $\tau_{FB}(k)$ from the zero crossing signal BEMFZX timing to generate the timing error signal $\tau_e(k)$.

The pattern clock generator 150 is configured to generate a clock signal in response to the timing signal. The pattern clock generator 150 may convert the clock signal to a higher/lower frequency than the timing signal. The recording pattern generator 160 is configured to write reference patterns 180 on the disk 110 through a read/write head 170.

The time intervals between the sequence of zero crossing signals BEMFZX (i.e., zero crossing periods) can vary while the spindle motor 120 is spinning. The variation of the zero crossing periods includes a repeatable component, which repeats with each revolution of the spindle motor 120, and a non-repeatable component. The non-repeatable component of zero crossing period variation can be caused by variation in the rotational speed of the spindle motor 120, where expansion and contraction of the zero crossing periods occurs as the spindle motor 120 slows down and speeds up, respectively. The repeatable component of zero crossing period variation can be caused by variations in the spacing of the magnetic poles and the slots between windings, variations in field strength of permanent magnets in the spindle motor 120, and variations in resistance and inductance in phase windings in the spindle motor 120. The repeatable component may change with spin speed and the invention will track and compensate asymptotically for changes in the repeatable component at each new spin speed.

Figure 2:
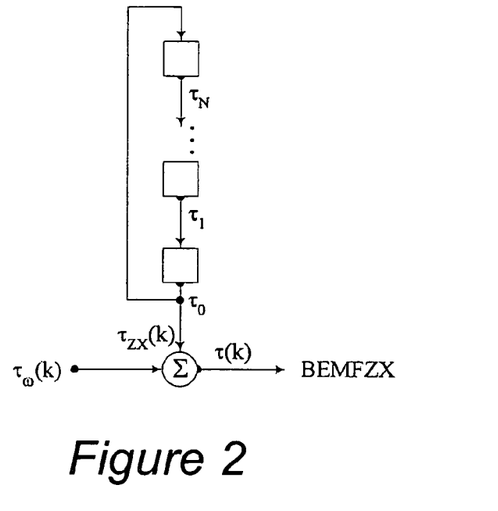
FIG. 2 is a schematic representation of repeatable and non-repeatable contributions to variations in the zero cross periods of back EMF of the spindle motor as the disk is rotated.

Accordingly, as shown in FIG. 2, the sequence of zero crossing signals BEMFZX are generated at times $\tau(k)$ and include a non-repeatable sequence $\tau_\omega(k)$ that is proportional to the rotational speed of the spindle motor 120 and a repeatable component $\tau_{zx}(k)$ that repeats with period N for each revolution of the spindle motor 120 (i.e., N zero crossing signals generated in sequence per revolution).

In accordance with embodiments of the present invention, the PLL 140 is augmented to compensate for the repeatable component $\tau_{zx}(k)$ of the variation of the zero crossing signal periods so that the timing signal generated by the PLL 140 is substantially independent of the repeatable component $\tau_{zx}(k)$. Because the effect of repeatable variation is essentially removed from the timing signal while leaving the effect of the non-repeatable sequence $\tau_\omega(k)$, which is proportional to the rotational speed of the spindle motor 120, the recording pattern generator 160 writes the reference pattern 180 with uniform circumferential spacing around the disk 110 as the rotational speed of the spindle motor 120 varies.

The repetitive sequence $\tau_{ZX}(k)$ can be accurately represented as having an average value of zero, where, for example, any non-zero average $\tau_{ZXavg}$ is attributed to a constant shift in the speed dependent part. Consequently, the zero crossing signal sequence $\tau(k)$ is the same, with or without $\tau_{ZX}(k)$ having a zero mean, as shown by Equation 1 below:

$$\tau(k) = \tilde{\tau}_\omega(k) + \tau\tilde{z}_X(k) \qquad (1)$$
$$= (\tilde{\tau}_\omega(k) + \tau_{ZXavg}) + (\tau\tilde{z}_X(k) - \tau_{ZXavg})$$
$$= \tau_\omega(k) + \tau_{ZX}(k)$$

Accordingly, the PLL 140 can generate the timing signal so that it tracks the rotational velocity of the spindle motor 120 and so that the reference patterns 180 are written with uniform spacing therebetween on the disk 110. More particularly, the compensator 142 and feedback generator 144 can be configured so that the feedback signal $\tau_{FB}(k)$ is about equal to the non-repeatable component $\tau_\omega(k)$, as represented by Equation 2 below:

$$\tau_{FB}(k) \approx \tau_\omega(k) \qquad (2)$$

Figure 3:
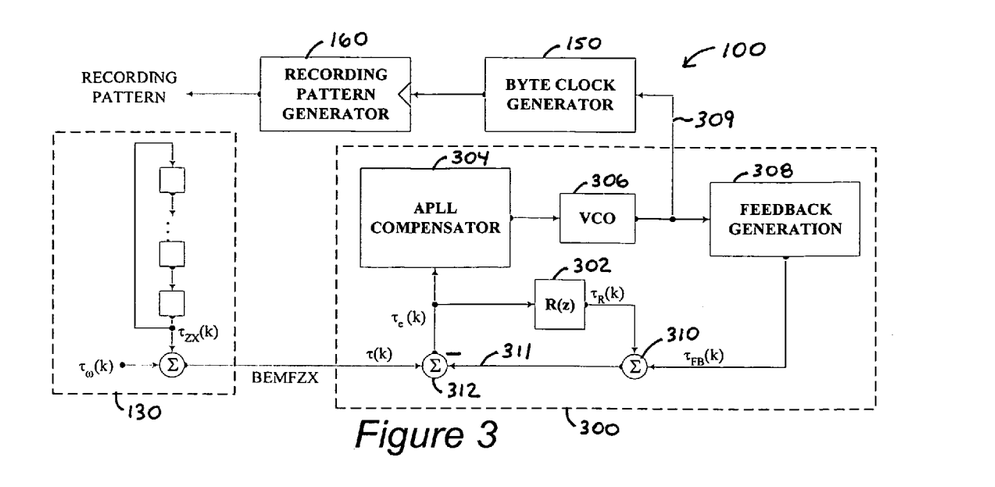
FIG. 3 is a block diagram of the apparatus of FIG. 1 and further illustrates an analog phase locked loop that is configured in accordance with some embodiments of the present invention.

Referring now to FIG. 3, a block diagram is illustrated of an analog PLL 300 embodiment of the apparatus 100. The PLL 300 includes a zero crossing repetitive compensator R(z) 302, a separate analog PLL (APLL) compensator 304, a Voltage Controlled Oscillator (VCO) 306 and a feedback generator 308, all or some of which may be embodied in analog (or discrete time analog where necessary) circuitry. The VCO 306 generates a timing signal 309 having a frequency that varies in response to a voltage control signal from the APLL compensator 304. The APLL compensator 304 generates the voltage control signal in response to a timing error signal $\tau_e(k)$. The zero crossing repetitive compensator R(z) 302 compensates the timing error signal $\tau_e(k)$ based on the variation of the zero crossing signal periods $\tau(k)$ continuously during revolutions of the spindle motor 120 to generate a compensation signal $\tau_R(k)$ that approximates the repeatable component $\tau_{zx}(k)$.

The feedback generator 308 generates a feedback signal $\tau_{FB}(k)$ in response to the timing signal 309. The frequency of the timing signal can have a rate N times faster than that of the reference back EMF zero crossing signals BEMFZX frequency. Accordingly, the feedback generator 308 may divide down the frequency of the timing signal 309 to generate the timing signal 309. A first summing node 310 combines the compensation signal $\tau_R(k)$ and the feedback signal $\tau_{FB}(k)$ to generate a compensated feedback signal 311. Accordingly, the compensation signal $\tau_R(k)$ from the zero crossing repetitive compensator R(z) 302 is used to adjust the arrival at comparator 312 of edges of the feedback signal $\tau_{FB}(k)$. The comparator 312 combines the compensated feedback signal 311 and the zero crossing signal BEMFZX, having periods $\tau(k)$, to generate the zero cross error signal $\tau_e(k)$. The zero crossing repetitive compensator R(z) 302 is configured to approximate the repeatable component $\tau_{zx}(k)$ of the BEMFZX arrival times, as represented by equations 3 and 4 below:

$$\tau_R(k) \approx \tau_{ZX}(k) \quad (3)$$

which then gives $$\tau_e(k) \approx 0 \quad (4).$$

The pattern clock generator 150, also referred to as a byte clock generator, operates as described above to generate the pattern that is to be written on the disk 110 in response to the timing signal 309. Because the repeatable variation component $\tau_{zx}(k)$ is essentially removed from the timing signal 309 while leaving the non-repeatable sequence $\tau_\omega(k)$, which is proportional to the rotational speed of the spindle motor 120, the recording pattern generator 160 can write the reference pattern 180 with uniform circumferential spacing around the disk 110 as the rotational speed of the spindle motor 120 varies.

Figure 4:
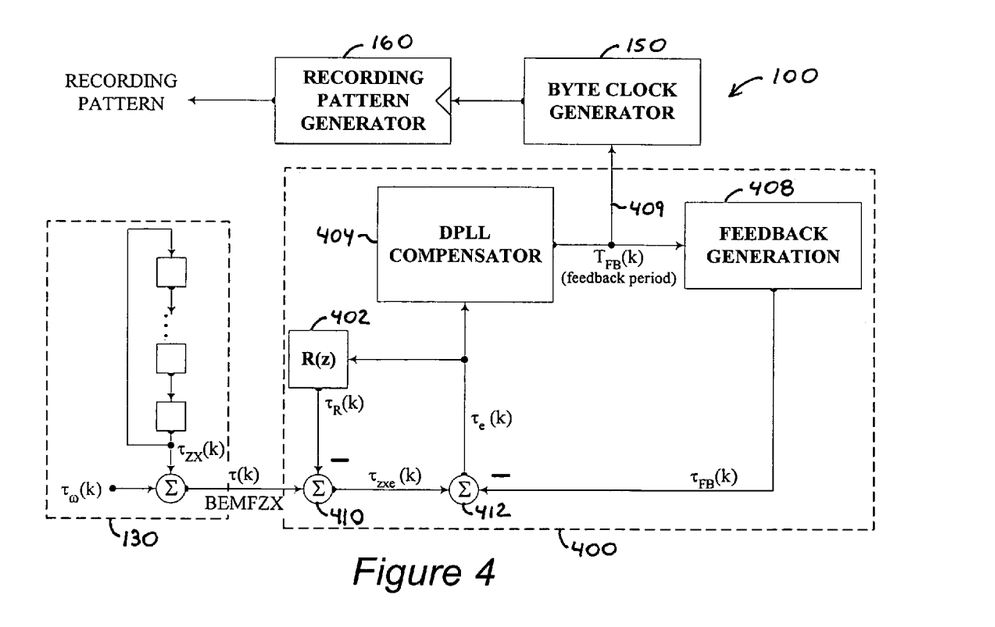
FIG. 4 is a block diagram of the apparatus of FIG. 1 and further illustrates a digital phase locked loop that is configured in accordance with some embodiments of the present invention.

Referring now to FIG. 4, a block diagram is illustrated of another embodiment of the apparatus 100 which includes a digital PLL 400. The PLL 400 can include a zero crossing repetitive compensator R(z) 402, a separate digital PLL (DPLL) compensator 404, and a feedback generator 408, all or some of which may be embodied in digital logic circuitry, such as in a microprocessor. The DPLL compensator 404 generates a timing signal 409 in response to a timing error signal $\tau_e(k)$. The zero crossing repetitive compensator R(z) 402 compensates the timing error signal $\tau_e(k)$ to generate a compensation signal $\tau_R(k)$ that estimates the repeatable component $\tau_{zx}(k)$ of variation in the zero crossing signal periods $\tau(k)$. The zero crossing repetitive compensator R(z) 402 can be further configured as described above with regard to the compensator 302.

The feedback generator 408 generates a feedback signal $\tau_{FB}(k)$ in response to the timing signal 409. A first summing node 410 subtracts the compensation signal $\tau_R(k)$ from the zero crossing signal BEMFZX, having periods $\tau(k)$, to generate a compensated zero crossing signal $\tau_{zxe}(k)$. Accordingly, the compensation signal $\tau_R(k)$ from the zero crossing repetitive compensator R(z) 402 is used to adjust the BEMFZX arrival times so that the compensated zero crossing signal $\tau_{zxe}(k)$ no longer contains the repeatable component $\tau_{zx}(k)$. The comparator node 412 subtracts the feedback signal $\tau_{FB}(k)$ from the compensated timing error signal $\tau_{zxe}(k)$ to generate the zero cross error signal $\tau_e(k)$.

The byte clock generator 150 and recording pattern generator 160 can be configured as described above to write the reference pattern 180 with uniform circumferential spacing around the disk 110 as the rotational speed of the spindle motor 120 varies.

Figure 5:
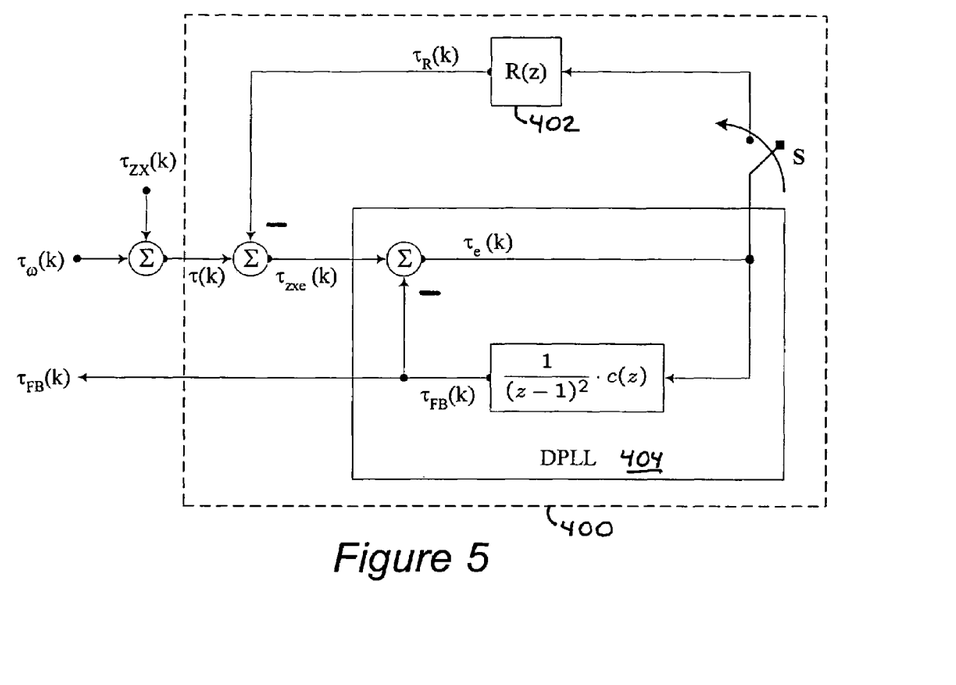
FIG. 5 is a block diagram of a zero crossing compensator in a digital phase locked loop that is configured in accordance with some embodiments of the present invention.

As described above, the zero crossing compensators R(z) can contain a timing reference model of the repetitive components in spindle motor 120 so as to estimate the repeatable component of variation in the zero crossing signal periods. With reference now to FIG. 5, a further embodiment of the zero crossing compensator 402 R(z) is now described in the context of the PLL 400 which been simplified, for purposes of explanation, to contain a representation of the compensator 402 R(z) and the DPLL compensator 404.

Referring to FIG. 5, the compensator 402 R(z) can be analyzed by applying the final value theorem and an internal model principle to the error $\tau_{zxe}(k)$ in response to the repetitive input $\tau_{ZX}(k)$. With a switch "S" in a closed position, the compensator 402 R(z) is in a loop of the system 400, otherwise the sequence $\tau_R(k)$ is assumed to be zero. Because it is desired to have the DPLL feedback edges track a reference component with edge arrival times that increase at constant increments (i.e. the input is a ramp), the DPLL compensator 404 contains a double integrator (i.e. two poles at z=1).

With the compensator 402 R(z) in the loop (i.e., switch S closed), the error $\tau_{zxe}(k)$ between the BEMFZX reference and the output of compensator 402 R(z) is provided as the gain from $\tau_{zxe}(k)$ to $\tau_e(k)$ with switch S in an open position, divided by a sum of unity and the loop gain from $\tau_{zxe}(k)$ to $\tau_R(k)$ including the compensator 402 R(z). With switch S open, the gain through the DPLL $\tau_{zxe}(k)$ to $\tau_e(k)$ can be represented by Equation 5 below:

$$S_p(z) = \cfrac{1}{1 + \cfrac{1}{(z-1)^2} \cdot c(z)} \quad (5)$$

$$= \frac{(z-1)^2}{(z-1)^2 + c(z)}$$

Accordingly, with compensator 402 R(z) in the loop (i.e., switch S closed), the error response $\tau_{zxe}(k)$ can be represented by Equation 6 below:

$$\tau_{zxe}(z) = \frac{1}{1 + R(z)S_p(z)} \cdot \tau_{ZX}(z) \quad (6)$$

For a given $\tau_{ZX}(k)$ the final value theorem can be used to determine if the closed loop system will have asymptotic tracking with zero error. The timing sequence repeats every N samples and can be represented through a Z-transform by Equation 7 below:

$$\tau_{zx}(z) = \frac{\tau_1 * z^N + \tau_2 * z^{N-1} + \ldots + \tau_N}{Z^N - 1} \quad (7)$$

Applying the final value theorem to Equation 6 forms Equation 8 below:

$$\lim_{k \to \infty} \tau_{zxe}(k) = \lim_{z \to 1}\left[(z-1) \cdot \frac{1}{1 + R(z)S_p(z)} \cdot \frac{\tau_1 * z^N + \tau_2 * z^{N-1} + \ldots + \tau_N}{Z^N - 1}\right] \quad (8)$$

$$= \lim_{z \to 1}\left[\left(\frac{1}{1 + R(z)S_p(z)}\right) \cdot \left(\frac{z-1}{Z^N - 1}\right)\right] \cdot \sum_{n=1}^{N} \tau_n$$

The relationship of Equation 8 is based on the quantity within the square brackets on the right hand side remaining stable which, can occur when the first quantity in the square brackets is zero at every unstable pole of the second quantity in the square brackets. More particularly, the unstable poles of the second quantity in the square brackets occur at the $N^{th}$ roots of unity (except at z=1). The first term in the square brackets goes to zero only where its denominator goes to infinity and if $S_p(z)$ is stable (so it is finite on the unit circle), this implies that R(z) must go to infinity at the $N^{th}$ roots of unity (except at z=1). That is, substituting in for $S_p(z)$ provides Equation 9 below:

$$1 + R(z)\frac{(z-1)^2}{(z-1)^2 + c(z)}\Bigg)\Bigg|_{z=e^{-i\frac{2\pi}{N}\cdot k}} = \infty, k = 1 \ldots N-1 \quad (9)$$

Pursuant to Equation 9, the unstable modes at the $N^{th}$ roots of unity are effectively cancelled between the $1^{st}$ and $2^{nd}$ terms in the brackets of the limit in equation (8). Also, although it is not required for the limit to be defined, from a practical point of view it is necessary that there be no unstable pole-zero cancellations occurring between R(z) and $S_p(z)$ so that the system as a whole is internally stable. Specifically, this means that R(z) should not have poles at z=1 where $S_p(z)$ has two zeros (e.g., with reference to Equation 5).

This is a re-statement of the internal model principle; that is, to have a system track a persistent input with zero asymptotic error, the loop gain must have poles at the unstable modes of the input, and the closed loop system must be internally stable. Accordingly, in some embodiments, R(z) must be configured as described by Equation 10 below:

$$R(z) = \alpha(z) \cdot \frac{z^{(N-1)}}{\prod_{n=1}^{N-1}\left(z - e^{i\frac{2\pi}{N}\cdot n}\right)} \quad (10)$$

$$= \alpha(z) \cdot \frac{z^{(N-1)}}{\sum_{n=1}^{N} z^{N-n}}$$

In this case, the limit in Equation 8 is defined and found to be zero, as defined by the equation below:

$$\lim_{k \to \infty} \tau_{zxe}(k) = \left(\sum_{n=1}^{N} \tau_n\right) = 0,$$

because the average value of the repetitive sequence is assumed to be zero without loss of generality. This is the result sought by Equation 3 that the output of the compensator 402 R(z) provide an estimate of the repeatable part that is then subtracted from the input to the DPLL 404.

Figure 6:
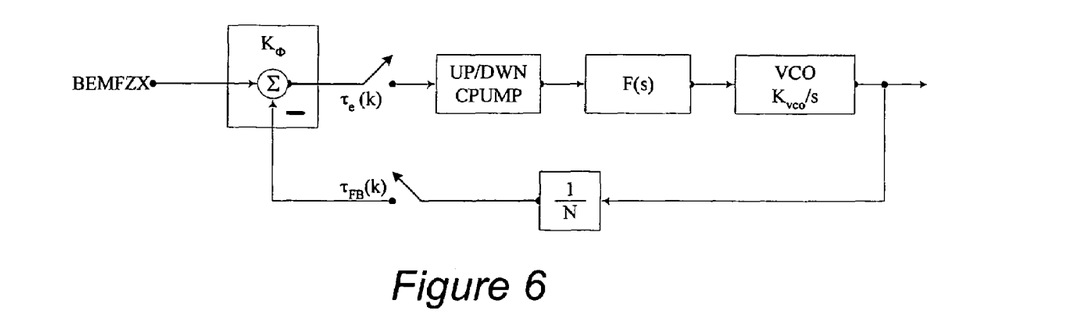
FIG. 6 is a block diagram of loop gain of an analog phase locked loop that is configured in accordance with some embodiments of the present invention.

FIG. 6 illustrates a representation of an exemplary loop gain of the analog PLL 300 of FIG. 3 according to some embodiments of the present invention. The loop gain of the analog PLL 300 has its input and output modulated/sampled in discrete time with each comparison of edges of the back EMF zero crossing signals BEMFZX and the feedback signal $\tau_{FB}(k)$.

Figure 7:
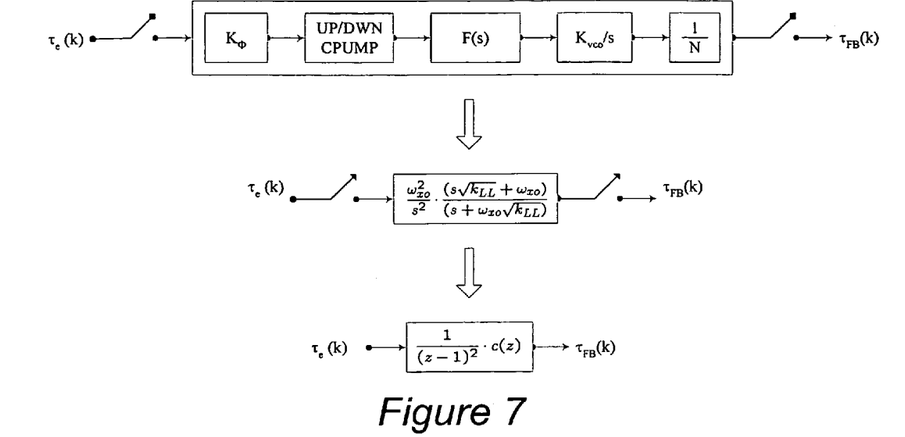
FIG. 7 is a block diagram of a discrete time representation of the analog phase locked loop of FIG. 6 in accordance with some embodiments of the present invention.

The exemplary APLL loop is normally compensated with an integrator plus lead lag network "F(s)" that is tuned so that the overall gain has a desired crossover $\omega_{xo}$. This again results in a system with two integrators as is the case for the DPLL 400. Through standard transformations, the APLL loop gain can be shown to have an equivalent, impulse invariant, discrete time gain that will contain two poles at z=1 as shown in FIG. 7, which illustrates a discrete time equivalent of the APLL. Note that "c(z)" in the APLL equivalent discrete time APLL is not necessarily the same as the "c(z)" in the DPLL of FIG. 5. However, both PLLs have double poles at z=1 so that with trivial modifications the development of the repetitive controller R(z) is the same for the APLL as it is for the DPLL.

The gain $\alpha(z)$ of the zero crossing repetitive compensators R(z) can, in some embodiments, be defined by Equation 11 below:

$$\alpha(z) = \alpha_0 \cdot \frac{z^{(N-2)} - 2}{z^{(N-1)}}. \quad (11)$$

The gain defined by Equation 11 can be used when N is greater than or equal to 2 as long as $\alpha_0 > 0$ is small enough to obtain a stable overall system. The compensator R(z) can therefore be represent by Equation 12 below:

$$R(z) = \alpha_0 \cdot \frac{z^{(N-2)} - 2}{\left(\sum_{n=1}^{N} z^{N-n}\right)} \quad (12)$$

$$= \alpha_0 \cdot \frac{z^{(N-2)} - 2}{(z^{N-1} + z^{N-2} + \ldots + z + 1)}$$

It is assumed for purposes of this exemplary embodiment that that N=24 and a DPLL compensator is used that provide a stable DPLL, as may be obtained with Equation 13 below:

$$c(z) = 0.25z - 0.2422 \quad (13)$$

Figure 8:
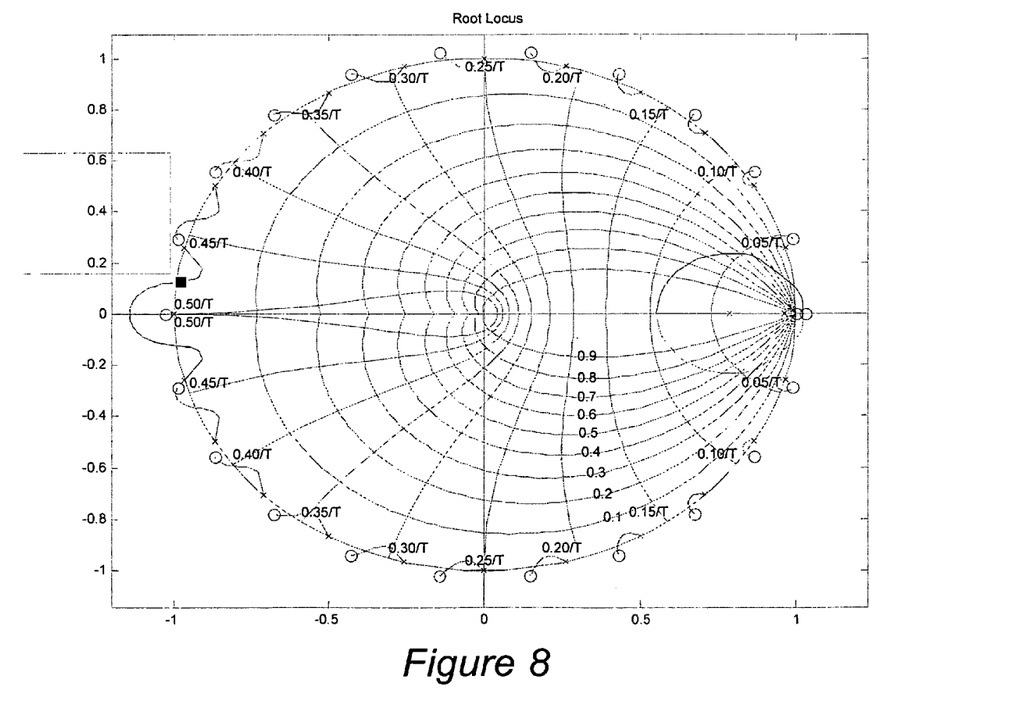
FIG. 8 is a root locus graph for a digital phase locked loop with a zero crossing compensator configured in accordance with some embodiments of the present invention.

The resulting loop gain can be represented by Equation 14 below, $$R(z)S(z) = \alpha_0 \cdot \frac{z^{(N-2)} - 2}{\left(\sum_{n=1}^{N} z^{N-n}\right)} \cdot \frac{(z-1)^2}{(z-1)^2 + c(z)} \quad (14)$$

and the poles of which are illustrated by the root locus graph as a function of $\alpha_0$ shown in FIG. 8 for an N of 24. As noted in FIG. 8, the DPLL with repetitive control in the loop (FIG. 5 with "S" closed) is stable as long as $\alpha_0$ is in a range defined by Equation 15 below:

$$0 < \alpha_0 < 0.281 \quad (15)$$

Figure 9:
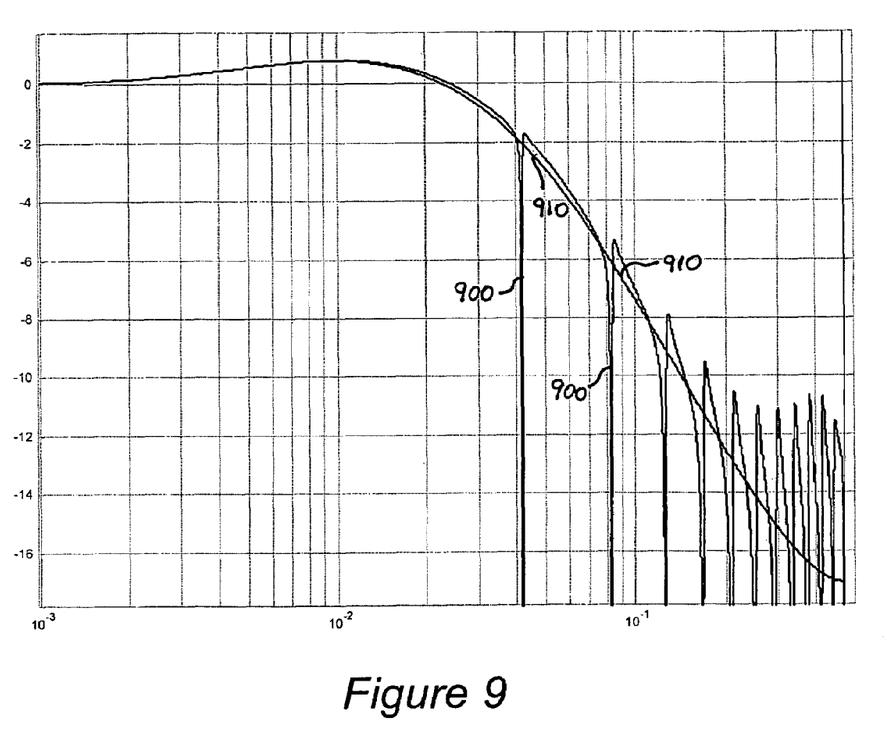
FIG. 9 is a graph of a simulation of the frequency response of a digital phase locked loop with and without a zero crossing compensator configured in accordance with some embodiments of the present invention.
Figure 10:
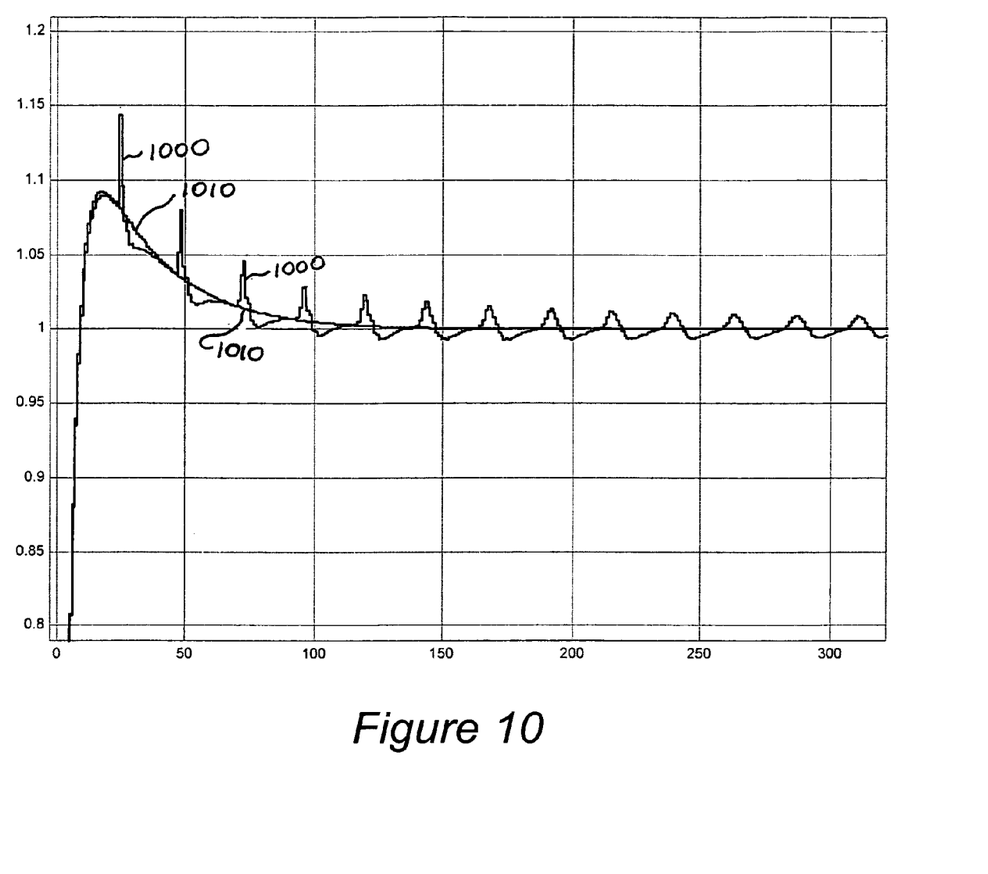
FIG. 10 is a graph of a simulation of the step response of a digital phase locked loop with and without a zero crossing compensator configured in accordance with some embodiments of the present invention.

Because this choice of compensator R(z) substantially removes any repetitive component with period N (=24 in this example) from entering the DPLL, the input to output response (i.e. $\tau_{FB}(z)/\tau_{ZX}(z)$ in FIG. 5) should have zero gain at the fundamental frequency (once every 24 samples) and its harmonics. FIG. 9 is a graph of a simulation with N of 24 that illustrates the input to output frequency response and demonstrates the expected zeros. The graph trace 900 corresponds to the DPLL having the compensator R(z), and graph trace 910 corresponds to the DPLL not having the compensator R(z). As shown in FIG. 9, the repetitive components are nulled while largely retaining the shape of the unmodified DPLL (at least in the band of interest where the gain is greater than or equal to 1). FIG. 10 is a graph of a simulation with N of 24 that illustrates the step response of the DPLL. The graph trace 1000 corresponds to the DPLL having the compensator R(z), and graph trace 1010 corresponds to the DPLL not having the compensator R(z). As shown in FIG. 10, the response of the DPLL is relatively unchanged with use of the zero crossing repetitive compensator. The step response shows distortion added by use of the zero crossing repetitive compensator while it converges to the zero repetitive content of a step (this R(z) does not track DC content).

In some embodiments, an APLL, such as APLL 300 of FIG. 3, may include a bipolar, pulse width modulated (PWM) form of the error between loop output (pattern timing) and the loop reference to adjust the output so that it is synchronous with the reference. The PWM waveform can be defined as a discrete time comparison of APLL output and input to generate a pulse width proportional to the timing error between the output and input signals. After the pulse width completes, a period of time elapses until the next discrete output to input comparison and subsequent pulse width is generated. The pulse widths "encode" the error in arrival time, or equivalently phase error, of the feedback edges relative to the reference edges. A zero arrival time error normally results in no net pulse width.

As explained above, the back EMF zero crossing signals BEMFZX have time periods τ(k) that vary according to a repeatable component $\tau_{ZX}(k)$ and a non-repeatable component $\tau_{\omega}(k)$. Without compensation for the repeatable component of the time period variations, then the APLL would generate a PWM pulse train so as to produce intervals at the APLL output which approximate the repeatable component of the time period variations. This is true even when variation in the non-repeatable component $\tau_{\omega}(k)$ is zero (i.e., spindle motor 120 having constant speed). According to some embodiments, an APLL produces intervals at the APLL output that are dependent substantially only on the rotational speed of the spindle motor 120 and, thereby, demarcate uniform increments of disk spin.

A complication specific to at least some analog/PWM type APLLs is that any non-zero pulse width generated in the error signal modulates the APLL output so that it is non-uniform between discrete comparisons of APLL input and output timing. If the APLL output frequency is generating a desired number of uniform intervals around the disk, the PWM signal should be zero. For example, an approach that injects extra pulses post reference-to-feedback comparison to null the repeatable part may produce inferior results compared to an approach that creates zero injection in response to the repeatable component of the APLL input intervals. Therefore, according to some embodiments, the APLL can compensate for the repeatable component of the BEMFZX timing to provide zero pulse width's at the loop error signal except when the disk speed (the underlying time base) changes.

In accordance with some embodiments of the present invention, the near zero PWM error signal is provided by injecting an estimate of the repeatable component of the BEMFZX timing into the APLL feedback intervals prior to their comparison with the APLL reference. The net effect is that the repeatable component of the BEMFZX timing is present in both the feedback and reference intervals and hence does not show up in the error between the two signals. This avoids generating any repeating sequences in the error PWM signal. The injection of the repeatable component of the BEMFZX timing can be carried out by actually adjusting the APLL feedback intervals to match the repeatable part of the reference as closely as possible, instead of by a direct manipulation of the PWM error signal or APLL input.

An additional problem inherent in at least some analog PLLs is that they are subject to persistent offsets and leakages in their circuit components and, as a result, at I/O comparison times the output is offset in time from the reference by some percentage of the reference period. The time offset can be static in that it is present at every comparison time, but it is not persistent in that it does not effect the APLL output except at the discrete time of the comparison. This static time offset is the right amount to cancel the equivalent error-referred effect of the parasitic offsets and leakages at other places in the APLL. More particularly, this static offset modulates the output of the loop every sample hit in a direction (faster or slower) that cancels the constant effect of the parasitic offsets and leakages. Thus, the APLL runs with a time offset between feedback and reference whether the repetitive controller R(z) is present or not.

Further, the static time offset between APLL input and output distorts the estimates of the repeatable component of the back EMF zero crossing periods $\tau_{zx}(k)$, and so some embodiments of the APLL are configured to compensate for the effect this static time offset.

Figure 11:
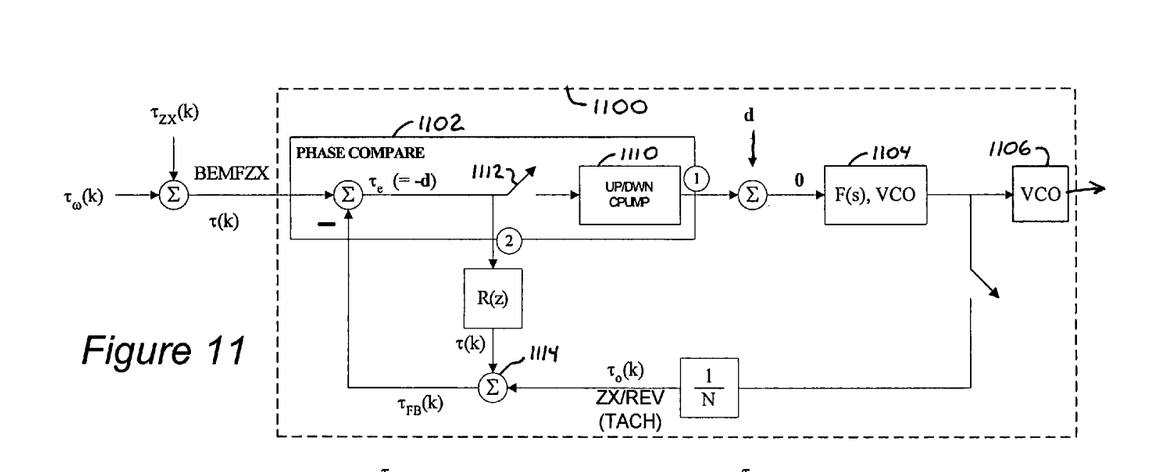
FIG. 11 is a block diagram of an analog phase locked loop in accordance with some embodiments of the present invention.

FIG. 11 illustrates a block diagram of a portion of an analog APLL 1100 in accordance with some embodiments of the present invention. The APLL 1100 may utilize a bipolar, pulse width modulated (PWM), waveform representation of the error between loop output (pattern timing) and the loop reference to adjust the output so that it is synchronous with the reference. The PWM waveform is discrete in time because it is generated by comparing the APLL output to its input only at discrete times to generate a pulse width that is proportional to the difference (error) between the output and input. After the pulse width is generated the PWM waveform then maintains a zero level until a next input to output comparison. The pulse widths "encode" the error in arrival time, or equivalently phase error, of the feedback edges relative to the reference edges. A zero arrival time error normally results in no net pulse width.

The APLL 1100 can include a phase comparator 1102, a loop compensator F(s) 1104, and a voltage controlled oscillator (VCO) 1106. The phase comparator 1102 can include comparison logic 1110 configured to produce a signal with three levels (positive, negative or zero current) at the output of a charge pump 1112. The two outputs of the phase comparator 1102 can have separate signal paths as shown in FIG. 11. The phase/time error $\tau_e$ can be converted to a pulse width at the charge pump 1112 (output 1) or as a number (output 2) for use in repetitive control as explained below.

FIG. 11 also depicts a parasitic, error-referred offset "d" which can occur when the loop is operating linearly (i.e. when the APLL is "phase locked") and subsequently creates a static timing offset between the back EMF zero crossing signal BACKEMFZX and the feedback signal. As a result, the PWM error signal at the charge pump 1112 can cancel the error-referred offset with a non-zero pulse width at each reference to feedback comparison. This offset canceling effect (rejection of a DC disturbance) can be an inherent property of a feedback loop containing two integrators, and may accumulate into the states of compensator R(z). Thus, the offset can show up as a slow mode at the output of R(z) unless the compensator is configured to have zero DC gain, such as explained above. Another approach for mitigating the offset, beyond the particular configuration of compensator R(z) is explained further below.

One challenge in the choice and configuration of an analog/PWM type APLL may be that any non-zero pulse width generated in the error signal can modulate the APLL output so that it is non-uniform between sample hits. For example, if the APLL output frequency is generating a desired number of uniform intervals around the disk, the PWM signal should be zero. Therefore, a scheme that compensates for the repeatable portion of the BEMFZX timing should be configured to achieve zero pulse width's at the loop error signal except when the disk speed (the underlying time base) changes. Alternatively, a scheme that injects extra pulses after the reference-to-feedback comparison to create a sequence of pulses with zero net area will still modulate the APLL output. Consequently, although a scheme for injecting extra pulses can remove the response to the repeatable part at the feedback edges, it can create undesirable variations in timing between feedback edges.

Some embodiments may provide a near zero PWM error signal by injecting an estimate of the reference's repeatable part into the APLL feedback intervals prior to their comparison with the APLL reference. The net effect is that the repeatable part is present in both the feedback and reference intervals and hence does not show up in the error between the two signals, which may avoid/decrease generation of any repeating sequences in the error PWM signal. The injection of the repeatable part may be carried out by adjusting the APLL feedback intervals to match the repeatable part of the reference as closely as possible. Thus, such injection of the repeatable part may be carried out without direct manipulation of the PWM error signal or the APLL input.

The compensator R(z) can receive as an input a measure of the phase error $\tau_e$ and generate therefrom an estimate $\tau_R(k)$ of the repetitive variation between the back EMF zero crossing periods. These estimates can be added to the uniform feedback (tach) intervals so that they contain the same non-uniformity as the input. When the output of the compensator R(z) matches $\tau_{ZX}(k)$ exactly, only changes in disk spin rate cause a non-zero phase error and so the VCO 1106 output frequency becomes dependent only on the disk spin speed ω. Accordingly, the APLL output intervals are adjusted (via the phase error) so that they can be used to write a uniformly spaced reference pattern on the spinning disk 110.

Figure 12A:
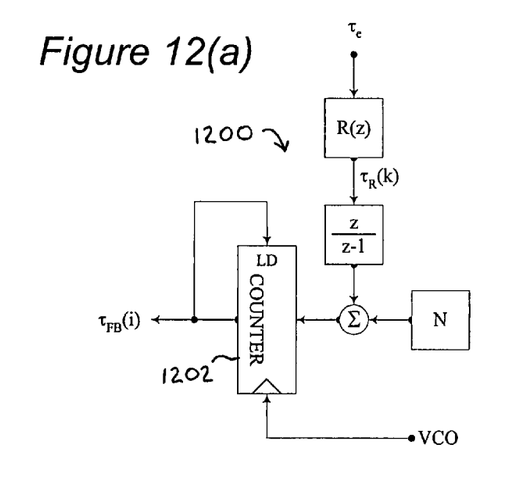
FIGS. 12(a)-12(b) are block diagrams of feedback generators for adjusting phase locked loop feedback intervals in accordance with some embodiments of the present invention.
Figure 12B:
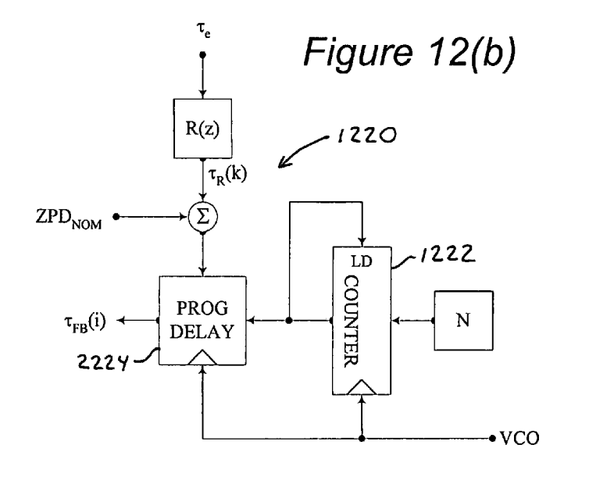

In FIG. 11, a summing node 1114 adds $\tau_R(k)$ into the loop to adjust each interval of the feedback signal $\tau_{FB}(k)$. The VCO frequency can be divided down through the use of a counter with modulus N. FIG. 12(a) illustrates a block diagram of an exemplary feedback generator 1200, which may be used as the generator 308 of FIG. 3, to down-convert the VCO frequency to generate the feedback signal $\tau_{FB}(k)$. The feedback generator 1200 includes a programmable counter 1202 which is configured as a frequency divider. FIG. 12(b) illustrates a block diagram of another embodiment of a feedback generator 1220 that includes a programmable counter 1222 and a programmable delay device 2224 (nominal delay $ZPD_{NOM}$) so that the delay line is causal even when the output from compensator R(z) is negative. The operation of feedback generator 1220 of FIG. 12(b) is further described below with regard to the comparator of FIG. 13.

Because the compensation signal $\tau_R(k)$ from the compensator R(z) is generated with the VCO output as a clock, its timing alternately dilates and contracts as the VCO rate slows or increases to track spin speed.

Figure 13:
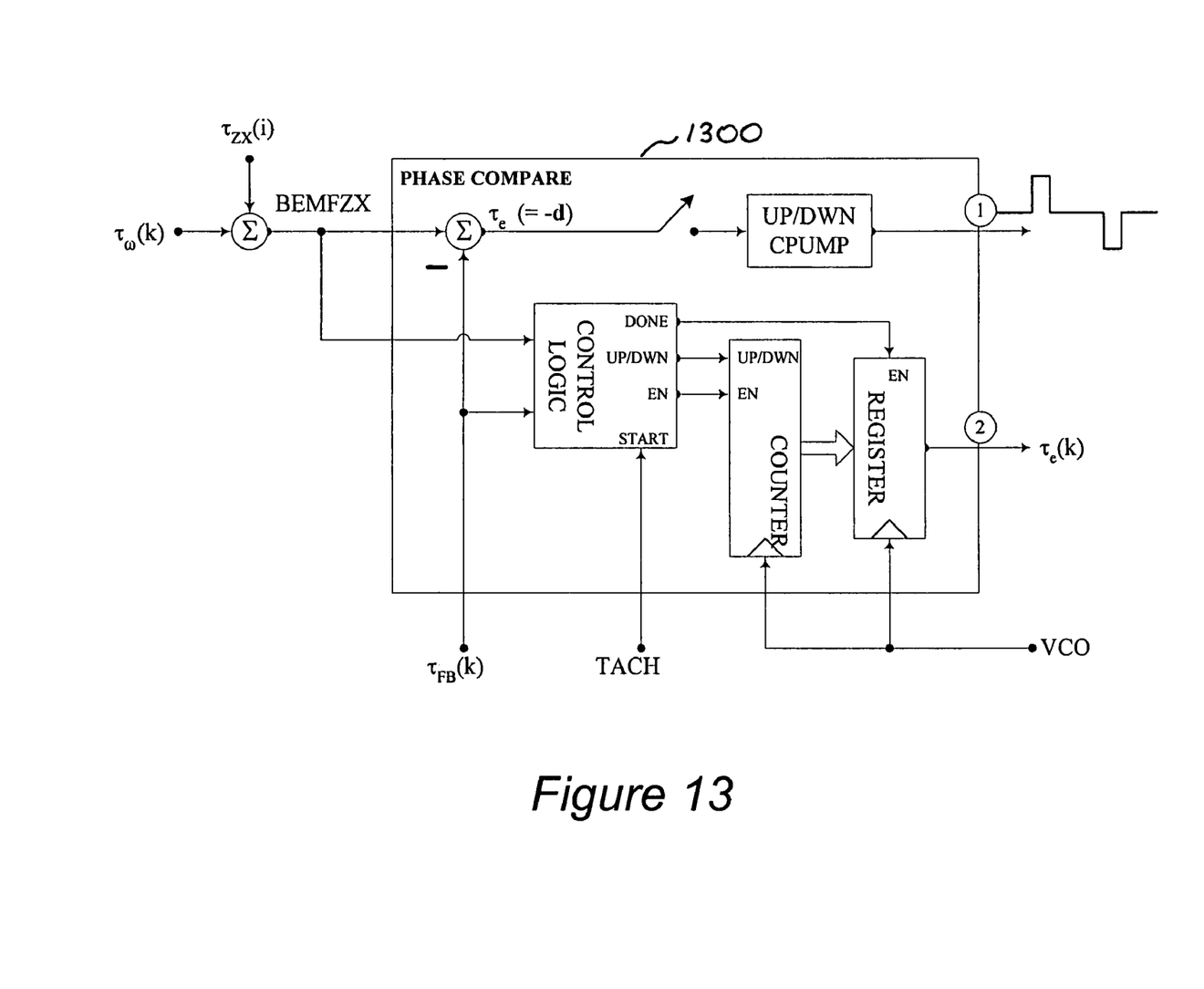
FIG. 13 is a further block diagram of the feedback generator of FIG. 12(b) in accordance with some embodiments of the present invention.

Because the APLL feedback intervals are adjusted in terms of VCO clocks, the measure (output 2 of FIG. 11) of the error $\tau_e(k)$ between APLL feedback and APLL input can be made in terms of VCO clocks by a comparator, for example, as by the block diagram of FIG. 13. The polarity is set up so that when the BEMFZX reference edge concluding interval 'k' arrives first, a negative $\tau_e(k)$ is generated reflecting that the feedback interval 'k' needs to be decreased. Similarly, when the BEMFZX reference edge concluding interval 'k' arrives last, the measure of error $\tau_e(k)$ generated is positive reflecting that the feedback interval is too short.

Figure 14:
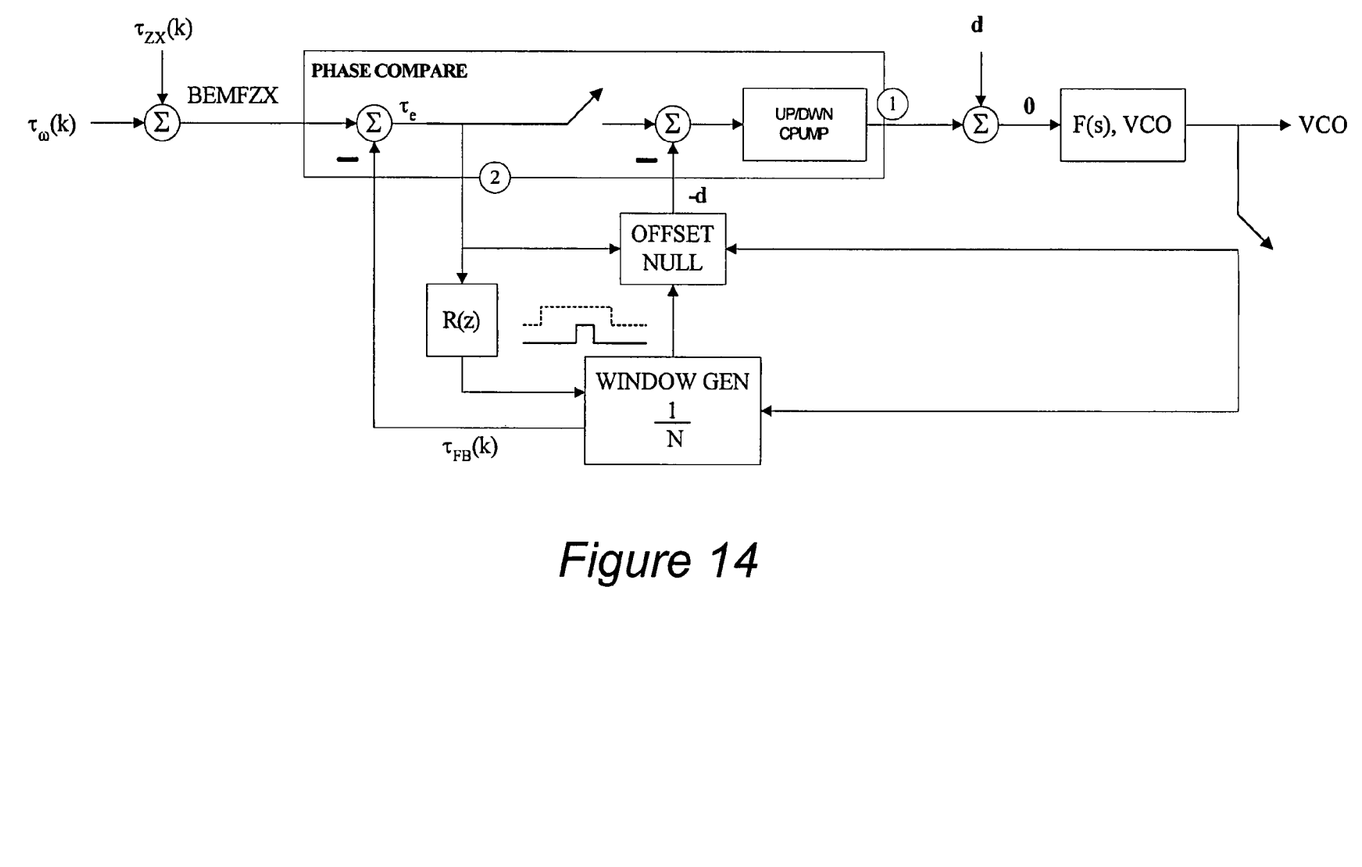
FIG. 14 is a block diagram that illustrates digital compensation in an analog phase locked loop in accordance with some embodiments of the present invention.

FIG. 14 is a block diagram of another embodiment of an APLL 1300, which includes the feedback generator 1220 of FIG. 12(b) to provide programmable delay feedback adjustment which generates a feedback signal that arrives in advance of comparison of the feedback signal $\tau_{FB}(k)$ to BEMFZX. The output of the feedback divider (TACH) occurs before comparison of edges of the feedback signal $\tau_{FB}(k)$ and BEMFZX by at least the relationship of Equation 19.

$$ZPD_{NOM} = \max(|\tau_R(k)|). \tag{19}$$

This causal relationship provides a convenient window for grouping APLL reference (BEMFZX) and feedback ($\tau_{FB}(k)$) pairs for comparison. Thus, once enabled by TACH, when the first edge at the conclusion of an interval 'k' arrives, the control logic sets the counter direction accordingly and the counter is enabled. When the second edge is arrives, the measure of arrival error for the interval 'k' is complete and the final count is registered as the error $\tau_e(k)$. This result is held until the next TACH marks the beginning of the measure sequence for interval 'k+1'. When the count is not enabled, it is held at zero (cleared).

Continuing reference to FIG. 14, compensators and associated methods for mitigating the persistent offsets and leakages in circuit components thereof and which may be used to reduce or remove the offset that would otherwise result between the APLL feedback edge and the reference are described below. Without mitigation, a static time offset would be present to cancel the equivalent error-referred effect of the parasitic offsets and leakages at other places in the APLL. Such offset can be undesirable for reasons that can include that, for example, the output of the loop can be modulated every sample hit by the offset, and the static time offset PWM term can contribute a pulse width that modulates the APLL output in a direction (faster or slower) which cancels the error-referred offset. Note that it is the "extra" modulation that is undesirable, not the cancellation of the error referred offset. Second, in some embodiments the compensator R(z) may have a non-zero response (shift) for static/DC components in the APLL error. This non-zero, DC response from compensator R(z) also modulates the timing at the APLL output so that it shifts away from the desired speed dependent reference $\tau_\omega(k)$.

To mitigate the effect of leakages and offsets, the feedback divider/tach can be enhanced to generate the feedback edge and a window both containing the repeatable component of the timing supplied by compensator R(z). One such approach is depicted in FIG. 14. An additional window/edge generation block can be inserted immediately after the programmable delay used to inject the output from R(z). Thus, both the window and the feedback edge can contain the repeatable timing of the reference as supplied by the compensator R(z). The window demarcates intervals during which the charge pump may be utilized to counteract the APLL leakage and offsets at times that are separate from the normal reference-to-feedback PWM error events. Accordingly, the "Offset Null" block in FIG. 14 is enabled outside the window centered on the APLL feedback edge and operates the charge pump to deliver a nearly constant output between comparisons that can be equal in magnitude to the error-referred offset "d".

The "OFFSET NULL" block outputs one VCO clock wide, high frequency, PWM pulses in-between reference-to-feedback comparisons. The number and period of the pulses as well as their polarity is tuned once per revolution of the disk 110, which may be carried out in a manner so as to minimize the average (DC) static offset between APLL reference and feedback, such as described below. For example, the process may wait for R(z) to converge to the repeatable part of the APLL reference. The average value of $\tau_e(k)$ may then be determined for one revolution of the disk 110 in terms of VCO cycles. This average then determines the number and polarity of pulses injected by the "OFFSET NULL" block. For example, if the average value of $\tau_e(k)$ is determined to be "$L_1$" VCO cycles long, then, between each reference-to-feedback comparison, the "OFFSET NULL" block outputs "$N_1=L_1$" evenly spaced pulses, each pulse being a single VCO cycle wide. This in effect spreads out the static offset with a width of "$L_1$" VCO cycles by "$L_1$" individual, one VCO cycle wide pulses that are spread out evenly between each regular ref-to-feedback comparison.

There can be a gain error because the charge pump output is responsive to the pulse width, and a single control pulse "$L_1$" VCO cycles wide can produce more output than using single VCO wide pulses "$N_1=L_1$" times. To compensate for this gain error, the number of evenly spaced output pulses from the "OFFSET NULL" block can be updated in response to each revolution of the disk 110. That is, once "$N_1=L_1$" pulses have been injected, the average value of $\tau_e(k)$ is again measured, (e.g., "$L_2$" VCO cycles), and the number of evenly spaced pulses can be updated in response thereto (e.g., updated to be "$N_2=N_1+L_2$"). This correction to "$N_i$" can be repeated a defined number of times or the update can be configured as "$N_{i+1}=N_i+p*L_{i+1}$," and repeated continuously where p<1 and "$L_i$" is the average value of $\tau_e(k)$ over one revolution in response to using "$N_i$" pulses between each reference-to-feedback comparison.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An apparatus for writing reference patterns on a data storage disk rotated by a spindle motor in a disk drive, the apparatus comprising:
   a back electromagnetic force (EMF) sense circuit configured to generate a sequence of zero crossing signals from back EMF sensed on windings of the spindle motor over each revolution of the spindle motor, the sequence of zero crossing signals defining a corresponding sequence of zero crossing periods of time between successive zero crossing signals;
   a Phase Locked Loop (PLL) circuit configured to generate a timing signal in response to comparison of a feedback signal to the zero crossing signals, and is configured to compensate for repeatable variation among the sequence of zero crossing periods over each revolution of the spindle motor so that the timing signal is substantially independent of the repeatable variation among the sequence of zero crossing periods; and
   a recording pattern generator configured to write reference patterns on the disk in response to the timing signal as the disk is rotated by the spindle motor.

2. The apparatus of claim 1, wherein:
   variation of the rotational speed of the spindle motor over time causes non-repeatable variation among the sequence of zero crossing periods; and
   the PLL circuit is configured to generate the timing signal so that the timing signal varies in proportion to the non-repeatable variation among the sequence of zero crossing periods as the rotational speed of the spindle motor varies.

3. The apparatus of claim 2, wherein the recording pattern generator is configured to respond to the timing signal to write the reference patterns with uniform circumferential spacing around the disk as the rotational speed of the spindle motor varies.

4. The apparatus of claim 3, wherein the recording pattern generator is further configured to vary timing between when it writes successive ones of the reference patterns in response to the timing signal to track variation in the rotational speed of the spindle motor.

5. The apparatus of claim 4, wherein:
   the recording pattern generator is further configured to write servo fields as the reference patterns for positioning a head relative to concentric tracks on the disk, and to write the servo fields in servo sectors on the disk with uniform circumferential spacing around the disk in the servo sectors as the rotational speed of the spindle motor varies.

6. The apparatus of claim 1, wherein the PLL circuit is configured to estimate the repeatable variation among the sequence of zero crossing periods for a revolution of the spindle motor, and to adjust time intervals of the zero crossing periods in response to the estimated repeatable variation between successive zero crossing periods so that the PLL output timing signal is substantially independent of the repeatable variation among the sequence of zero crossing periods.

7. The apparatus of claim 6, wherein the PLL circuit is configured to decrease a present timing interval in a zero crossing period from the back EMF sense circuit in response to an estimated increase of zero crossing period between a most recently sensed zero crossing signal and next successive zero crossing signal, and to increase the present timing interval in the zero crossing period in response to an estimated decrease of zero crossing period between the most recently sensed zero crossing signal and the next successive zero crossing signal.

8. The apparatus of claim 1, wherein the PLL comprises:
   a Voltage Controlled Oscillator (VCO) configured to generate the timing signal having a frequency that varies in response to a voltage control signal;
   an analog PLL compensator configured to generate the voltage control signal in response to a timing error signal;
   a zero crossing repetitive compensator configured to compensate the timing error signal based on estimations of repeatable variation among the sequence of zero crossing periods for a revolution of the spindle motor to generate a compensation signal;
   a feedback generator configured to generate a feedback signal in response to the timing signal;
   a first summing node configured to combine the repetitive compensation signal and the feedback signal to generate a compensated feedback signal; and
   a second summing node configured to combine the compensated feedback signal and the zero crossing signal to generate the timing error signal.

9. The apparatus of claim 8, wherein the feedback generator is configured to divide down the frequency of the timing signal to generate the feedback signal.

10. The apparatus of claim 1, wherein the PLL comprises:
    a digital PLL compensator configured to generate the timing signal in response to a timing error signal;

a digital repetitive zero crossing repetitive compensator configured to compensate the timing error signal based on estimations of repeatable variation among the sequence of zero crossing periods for a revolution of the spindle motor to generate a compensation signal;

a feedback generator configured to generate a feedback signal in response to the timing signal;

a first summing node configured to combine the compensation signal and the zero crossing signal to generate a compensated zero crossing signal; and a second summing node configured to combine the compensated zero crossing signal and the feedback signal to generate the timing error signal.

11. The apparatus of claim 1, wherein the back EMF sense circuit, the PLL circuit, and the recording pattern generator are enclosed within a housing of the disk drive, and the recording pattern generator is configured to write servo fields as the reference patterns for positioning a head relative to concentric tracks on the disk, and to write the servo fields in servo sectors on the disk with uniform circumferential spacing around the disk as the rotational speed of the spindle motor varies.

12. The apparatus of claim 1, wherein the recording pattern generator is part of a servo track writer that is separate from the disk drive.

13. A method of writing reference patterns on a data storage disk in a disk drive, wherein the disk drive comprises the data storage disk, a spindle motor configured to rotate the disk, and a head configured to read and write data on the disk, the method comprising:

generating a sequence of zero crossing signals from back electromagnetic force (EMF) sensed on windings of the spindle motor over each revolution of the spindle motor, the sequence of zero crossing signals defining a corresponding sequence of zero crossing periods of time between successive zero crossing signals;

generating a timing signal in response to comparison of a feedback signal to the zero crossing signals;

compensating for repeatable variation among the sequence of zero crossing periods over each revolution of the spindle motor so that the timing signal is substantially independent of the repeatable variation among the sequence of zero crossing periods; and writing reference patterns on the disk in response to the timing signal as the disk is rotated by the spindle motor.

14. The method of claim 13, wherein variation of the rotational speed of the spindle motor over time causes non-repeatable variation among the sequence of zero crossing periods, the method further comprising generating the timing signal so that it varies proportional to the non-repeatable variation among the sequence of zero crossing periods as the rotational speed of the spindle motor varies.

15. The method of claim 14, wherein writing reference patterns on the disk in response to the timing signal as the disk is rotated by the spindle motor comprises responding to the timing signal to write the reference patterns with uniform circumferential spacing around the disk as the rotational speed of the spindle motor varies.

16. The method of claim 15, wherein responding to the timing signal to write the reference patterns with uniform circumferential spacing around the disk as the rotational speed of the spindle motor varies comprises varying timing between when successive ones of the reference patterns are written on the disk in response to the timing signal to track variation in the rotational speed of the spindle motor.

17. The method of claim 16, wherein writing reference patterns on the disk in response to the timing signal as the disk is rotated by the spindle motor further comprises writing servo fields in servo sectors on the disk with uniform circumferential spacing around the disk in the servo sectors as the rotational speed of the spindle motor varies, wherein the servo fields are configured for positioning the head relative to concentric tracks on the disk.

18. The method of claim 13, wherein compensating for repeatable variation among the sequence of zero crossing periods comprises:

generating the timing signal with a frequency that varies in response to a voltage control signal;

generating the voltage control signal in response to a timing error signal;

compensating the timing error signal based on estimations of repeatable variation among the sequence of zero crossing periods for a revolution of the spindle motor to generate a compensation signal;

generating a feedback signal in response to the timing signal;

combining the compensation signal and the feedback signal to generate a compensated feedback signal; and combining the compensated feedback signal and the zero crossing signal to generate the timing error signal.

19. The method of claim 13, wherein compensating for repeatable variation among the sequence of zero crossing periods comprises:

generating the timing signal in response to a timing error signal;

compensating the timing error signal based on estimations of repeatable variation among the sequence of zero crossing periods for a revolution of the spindle motor to generate a compensation signal;

generating a feedback signal in response to the timing signal;

combining the compensation signal and the zero crossing signal to generate a compensated zero crossing signal; and combining the compensated zero crossing signal and the feedback signal to generate the timing error signal.

20. A servo writer configured to write servo fields on a data storage disk rotated by a spindle motor in a disk drive, the servo writer comprising:

a back electromagnetic force (EMF) sense circuit configured to generate a sequence of zero crossing signals from back EMF sensed on windings of the spindle motor over each revolution of the spindle motor, the sequence of zero crossing signals defining a corresponding sequence of zero crossing periods of time between successive zero crossing signals;

a Phase Locked Loop (PLL) circuit configured to generate a timing signal in response to comparison of a feedback signal to the zero crossing signals, and is configured to compensate for repeatable variation among the sequence of zero crossing periods over each revolution of the spindle motor so that the timing signal is substantially independent of the repeatable variation among the sequence of zero crossing periods; and a recording pattern generator configured to write reference patterns on the disk in response to the timing signal as the disk is rotated by the spindle motor.

* * * * *